(12) United States Patent
Matsuoka et al.

(10) Patent No.: US 6,342,178 B1
(45) Date of Patent: Jan. 29, 2002

(54) REPLICA MOLDING

(75) Inventors: Yasuhiko Matsuoka; Tarou Kita, both of Sagamihara; Hironao Fujiki; Takafumi Sakamoto, both of Usui-gun; Shohei Nakamura; Kousi Anai, both of Fuji, all of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 08/936,553

(22) Filed: Sep. 24, 1997

(30) Foreign Application Priority Data

Sep. 25, 1996 (JP) .............................. 8-274068

(51) Int. Cl.[7] .............................................. B29C 35/08
(52) U.S. Cl. ...................... 264/496; 264/152; 264/220; 264/225; 264/226; 264/227
(58) Field of Search ................. 264/496, 226, 264/225, 220, 219, 227, 152

(56) References Cited

U.S. PATENT DOCUMENTS

| | | | |
|---|---|---|---|
| 3,308,223 A | * 3/1967 | Hoppes | 264/220 |
| 4,596,720 A | * 6/1986 | Keryk et al. | 47/54.1 |
| 4,822,434 A | * 4/1989 | Sawaki et al. | 156/48 |
| 4,859,394 A | * 8/1989 | Benton et al. | 264/225 |
| 5,100,993 A | * 3/1992 | Hida et al. | 528/30 |
| 5,154,861 A | * 10/1992 | McBrierty et al. | 264/1.4 |
| 5,164,128 A | * 11/1992 | Modrek et al. | 264/22 |
| 5,402,351 A | * 3/1995 | Batchelder et al. | 364/468 |
| 5,700,417 A | * 12/1997 | Fernyhough et al. | 264/477 |
| 5,952,397 A | * 9/1999 | Fujiki et al. | 522/99 |
| 6,017,973 A | * 1/2000 | Tamura et al. | 522/96 |

FOREIGN PATENT DOCUMENTS

| | | |
|---|---|---|
| DE | 3713578 | 5/1988 |
| EP | 446040 A1 * | 9/1991 |
| EP | 0 498 592 | 8/1992 |
| EP | 0 506 404 | 9/1992 |
| EP | 0 446 040 A1 * | 9/1997 |
| EP | 0 819 714 | 1/1998 |
| JP | 3-114711 | 5/1991 |

* cited by examiner

*Primary Examiner*—Suzanne E. McDowell
(74) *Attorney, Agent, or Firm*—Millen, White, Zelano & Branigan, P.C.

(57) ABSTRACT

Replicas are molded by curing a photo-curable liquid silicone rubber composition to form a transparent mother mold having a cavity corresponding to the outer contour of a master model, casting a photo-curable liquid resin into the mold cavity, and irradiating light to the liquid resin through the mold wall. Replicas can be fabricated by simple steps and within a short time.

14 Claims, 9 Drawing Sheets

REPLICA MOLDING

BACKGROUND OF THE INVENTION

1. Field of the Invention

This invention relates to a method for molding replicas such as automobile parts and household appliances. This invention also relates to an apparatus for molding such replicas.

2. Prior Art

In a process for developing a new model of automobile part or household appliance, a certain number of products must be produced for the purpose of confirming the outer appearance, shape and performance. To this end, various procedures were developed in the prior art. Among others, a procedure of producing a precision part replica using a mold of silicone rubber, known as a vacuum casting procedure, is widely used in the art. In this procedure, a pattern of molding serving as a master model is prepared from a suitable material such as wood, plastics and metals by manual modeling or by means of a machine tool (which can be controlled on the basis of three-dimensional CAD data). It was recently developed to produce a master model by an optical shaping system of irradiating a UV laser beam to a photo-curable resin in accordance with three-dimensional CAD data inputs.

In general, a replica is produced by burying the thus obtained master model in an addition/heat curable liquid silicone rubber composition, curing the silicone rubber composition, removing the master model, casting a thermosetting resin into the cavity in the cured silicone rubber where the master model has been removed, heating the thermosetting resin for curing. What is desired in the art is to produce such replicas within a short time. Attempts to meet such expectation have been made. For example, JP-A 114711/1991 discloses a method for producing a molded part by introducing a UV-curable liquid resin (epoxy or acrylic reactive resin) into a mold made of a transparent addition room temperature vulcanizable (RTV) silicone rubber composition, and irradiating UV to the liquid resin for curing. Combining these techniques, however, is far from satisfying the user's demand to test replicas within as short a time as possible from the design of a model shape.

SUMMARY OF THE INVENTION

Therefore, an object of the invention is to provide a method for molding a replica by forming a master model, forming a mother mold of silicone rubber on the basis of the master model, and casting a resin into the mold cavity to form a replica, the method being improved such that the replica can be briefly produced through a simple operation.

Another object of the invention is to provide an apparatus for molding a replica through a simple operation with ease.

We have found that when the mother mold is formed of a photo-curable liquid silicone rubber composition and a photo-curable liquid resin is used as the liquid resin to be filled in the mold cavity to produce the replica, quite unexpectedly, the photo-curable liquid resin filled in the mold cavity can be photo-cured by performing light irradiation from outside the mother mold formed of a transparent cured product of the photo-curable liquid silicone rubber composition. That is, the replica can be briefly produced through a simple operation.

Accordingly, according to a first aspect of the invention, there is provided a method for molding a replica, comprising the steps of forming a mother mold from a transparent cured product of a photo-curable liquid silicone rubber composition, the mother mold having a cavity corresponding to the outer contour of an article to be duplicated, filling the mold cavity with a photo-curable liquid resin, and irradiating light to the photo-curable liquid resin from outside the mother mold, thereby curing the photo-curable liquid resin within the mother mold to produce a replica.

According to a second aspect of the invention, there is provided a method for molding a replica, comprising the steps of (a) filling a container having at least one light-transmissive side surface with a photo-curable liquid silicone rubber composition, submerging a master model in the liquid silicone rubber composition, and irradiating light to the liquid silicone rubber composition to cure the composition to form a transparent silicone rubber part having the master model embedded therein, (b) cutting the silicone rubber part into sections and removing the master model therefrom, the sections when mated constituting a silicone rubber mother mold having a cavity corresponding to the outer contour of the master model, (c) mating the sections of the silicone rubber mother mold, filling the cavity with a photo-curable liquid resin, and irradiating light to the photo-curable liquid resin from outside the mother mold, thereby curing the photo-curable liquid resin within the mother mold to produce a replica, (d) removing the replica from the silicone rubber mother mold.

According to a third aspect of the invention, there is provided an apparatus for molding a replica comprising a mother mold having a cavity corresponding to the outer contour of an article to be duplicated, said mother mold being formed from a transparent cured product of a photo-curable composition, a means for casting or filling the mold cavity with a photo-curable liquid resin, and a means for irradiating light to the photo-curable liquid resin from outside the mother mold thereby curing the photo-curable resin.

The master model is advantageously produced by an optical shaping process of irradiating light to a photo-curable liquid resin composition in accordance with CAD data inputs regarding the shape and dimensions of the master model designed by three-dimensional CAD technique, thereby curing the resin composition.

BRIEF DESCRIPTION OF THE DRAWINGS

FIG. 1 is a perspective view of a computer display illustrating the three-dimensional computer-aided designing (CAD) of a master model.

FIG. 2 illustrates the master model produced by the three-dimensional CAD technique.

FIG. 3 illustrates the step of secondary curing the master model.

FIG. 4 illustrates the step of taping the master model.

FIG. 5 illustrates the master model secured to an acrylic frame.

FIG. 6 illustrates the step of deaerating a photo-curable liquid silicone rubber composition.

FIG. 7 illustrates the step of pouring the silicone rubber composition into the acrylic frame having the master model secured therein.

FIG. 8 illustrates the step of deaerating the silicone rubber composition in the frame.

FIG. 9 illustrates the step of irradiating light to the silicone rubber composition to cure the composition.

FIG. 10 illustrates the step of cutting the cured silicone rubber composition into two mold sections and separating the mold sections, allowing the master model to be removed therefrom.

FIG. 11 illustrates the step of secondary curing of the silicone rubber mold sections.

FIG. 12 illustrates the step of deaerating a photo-curable liquid resin.

FIG. 13 illustrates the step of casting the photo-curable liquid resin into the silicone rubber mother mold.

FIG. 14 illustrates the step of irradiating light to the liquid resin through the mother mold for curing to form a replica.

FIG. 15 illustrates the step of separating the mold sections after the light irradiating step, allowing the replica to be removed therefrom.

FIG. 16 illustrates the step of secondary curing the replica.

DESCRIPTION OF THE PREFERRED EMBODIMENTS

Figure 1:
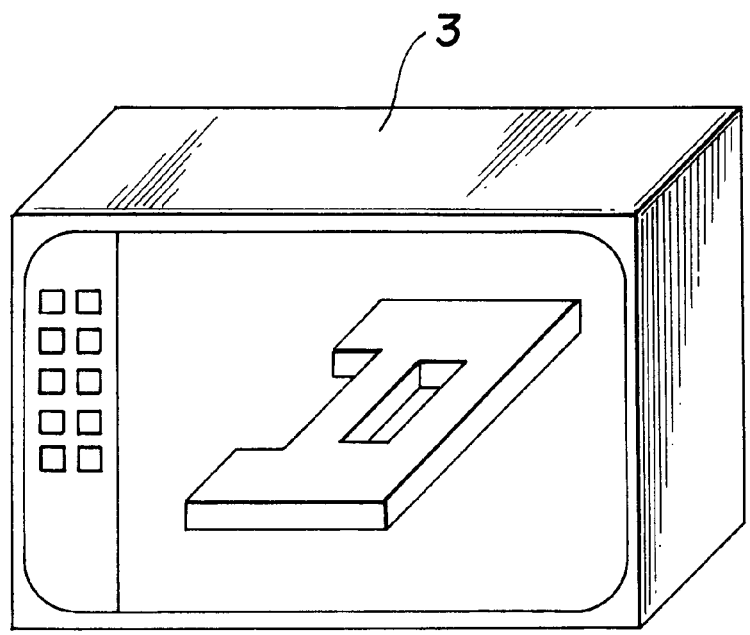
FIGS. 1 through 16 illustrate an overall method for molding a replica according to one embodiment of the invention.

According to the replica molding method of the invention, a mother mold having a cavity corresponding to the outer contour of an article to be duplicated is formed from a transparent cured product of a photo-curable liquid silicone rubber composition, the mold cavity is then filled with a photo-curable liquid resin, and thereafter, light is irradiated to the photo-curable liquid resin from outside the mother mold for thereby curing the liquid resin within the mother mold to produce a replica.

To obtain the mother mold, a pattern or master model is first produced. Any of conventional techniques used in the prior art replica molding method is applicable. The master model may be made of wood, plastics, metals and composite materials thereof. Useful master model configuring techniques include carving of a wood block and machining of a material by a machine tool. The material can also be machined into the desired shape by computer-aided manufacturing using three-dimensional CAD data. Further, the master model may be produced by machining a plastic material or assembling plastic material pieces.

Alternatively, the master model may be produced using an optical shaping system wherein the information relating to the position and shape of contour surfaces of the master model is acquired by a three-dimensional CAD system, light is selectively irradiated to a photo-curable liquid organic resin composition at positions corresponding to the designed shape on the basis of the information for curing the resin composition to form a three-dimensional shape. The optical shaping system used herein may be a commercially available one, for example, Solid Creation System by D-MEC Co., SOUP by C-MET Co., SLA by Nippon 3D Systems K.K., and SOLIFORM by Teijin Seiki K.K. The preparation of a master model by the optical shaping system is most advantageous in that the time required for the preparation is short. The preparation of a master model by the optical shaping system has the additional advantage that a master model which is corrected for expected dimensional changes occurring in subsequent steps can be easily prepared.

It is noted that the photo-curable liquid organic resin composition used in the optical shaping technique may be selected from the same as the photo-curable liquid organic resin compositions to be described later.

The master model thus prepared is submerged in a photo-curable liquid silicone rubber composition which is filled in a container having at least one light transmissive side surface. Light is irradiated to the silicone rubber composition through the light transmissive side surface of the container to cure the silicone rubber composition into a transparent silicone rubber part in which the master model is embedded and which is to serve as a mother mold. After the silicone rubber part is fully cured (secondary curing), it is cut into two sections, which are separated from each other to allow the master model to be removed therefrom. After removal of the master model, a cavity corresponding to the outer contour of the master model is left behind in each silicone rubber section. When the sections are mated together, they form a silicone rubber mother mold defining a cavity corresponding to the outer contour of the master model.

Then, the mold sections are mated to form the silicone rubber mother mold, and the mold cavity is filled with a photo-curable liquid resin. Light is irradiated to the liquid resin through the transparent silicone rubber mother mold to cure the liquid resin within the mother mold. Thereafter, the cured resin or replica is taken out of the mother mold. The replica is produced in this way.

In this case, it is preferable that the means for filling the mold cavity with the photo-curable liquid resin is provided with a means for agitating and defoaming the photo-curable liquid resin under a reduced pressure, thereby obtaining a replica having no bubbles therein.

The term "light" used herein designates actinic radiation capable of curing photo-curable liquid silicone rubber compositions and photo-curable liquid resins. The term "photo" is used in the same sense. Ultraviolet light having a wavelength of 200 to 500 nm, especially ultraviolet light having a wavelength of 300 to 400 nm is typically used although the wavelength is not critical insofar as light has a radiation curing ability. Light sources capable of emitting such light include UV fluorescent lamps, high pressure mercury vapor lamps, metal halide lamps, and xenon lamps although the light source is not critical insofar as it can emit actinic radiation capable of curing photo-curable liquid silicone rubber compositions and photo-curable liquid resins. UV fluorescent lamps are preferred light sources because of the cost and ease of handling.

According to the invention, the mother mold is formed of the photo-curable liquid silicone rubber composition as mentioned above, which is advantageous in that the time required to form the mother mold and hence, the replica is significantly reduced, as compared with conventional addition heat vulcanizable or room temperature vulcanizable silicone rubber compositions.

The photo-curable liquid silicone rubber composition is preferably one which cures into a product (that is, mother mold) having a Shore A hardness of 20 to 60, more preferably 30 to 50. With a mold hardness of less than 20 in Shore A, there would be formed replicas of insufficient precision.

With a mold hardness of more than 60 in Shore A, it would become difficult to remove a replica of complex shape such as having inverted taper. The cured mold must be transmissive to actinic radiation in order that the photo-curable liquid resin cast in the mold cavity be cured with the actinic radiation. The cured mold should preferably have an actinic radiation transmittance of at least 10%T at a mold gage of 10 mm, for example. With a transmittance of less than 10%T, insufficient light is transmitted by a silicone rubber mother mold having a wall gage of several tens of millimeter so that the photo-curable liquid resin in the mold cavity might be insufficiently cured, restraining removal of the cured product from the mother mold.

Therefore, the silicone rubber composition is preferably selected from photo-curable liquid silicone rubber compositions which are curable upon exposure to light into a cured product having a Shore A hardness of 20 to 60 and a transmittance of incident actinic radiation of at least 10%T at a wall gage of 10 mm. Preferred are first to third photo-curable liquid silicone rubber compositions to be described below.

First Photo-curable Liquid Silicone Rubber Composition

The first photo-curable liquid silicone rubber composition is comprised of (i) 100 parts by weight of an organopolysiloxane and (ii) 0.01 to 5 parts by weight of a photo-initiator. The organopolysiloxane (i) consists of (A) 30 to 100% by weight of an organopolysiloxane of the following average compositional formula (1):

$$R_a R^1_b SiO_{(4-a-b)/2} \quad (1)$$

wherein R, which is identical or different, is a substituted or unsubstituted monovalent hydrocarbon group free of an aliphatic unsaturated bond or an alkoxy group; $R^1$, which is identical or different, is a photo-reactive group selected from a (meth)acryloyl-containing group, vinyloxyalkyl group, and epoxy-containing group; and letters a and b are positive numbers satisfying $1.90 \leq a < 2.40$, $0.0003 \leq b \leq 0.10$, and $1.90 < a+b \leq 2.40$, the organopolysiloxane containing at least two photo-reactive groups in a molecule and having a viscosity of 100 to 1,000,000 centipoise at 25° C., and (B) 0 to 70% by weight of a silicone resin comprising $R_p R_q SiO_{1/2}$ units (M), $SiO_2$ units (Q), and/or $XSiO_{3/2}$ units (T) wherein R and $R^1$ are as defined above, letters p and q each are equal to 0, 1, 2 or 3 and satisfy p+q=3, X is selected from R and $R^1$, molar ratio M/(Q+T)=0.6 to 1.2, and molar ratio $R^1$/Si=0.01 to 0.10, the silicone resin being soluble in component (A).

In the organopolysiloxane of formula (1) constituting component (A), the monovalent hydrocarbon groups represented by R are preferably those having 1 to 10 carbon atoms, especially 1 to 8 carbon atoms, for example, alkyl groups such as methyl, ethyl, propyl, isopropyl, butyl, isobutyl, tert-butyl, pentyl, hexyl, octyl, and decyl, cycloalkyl groups such as cyclopentyl and cyclohexyl, aryl groups such as phenyl and tolyl, and aralkyl groups such as benzyl and phenylethyl. The alkoxy groups represented by R are preferably those having 1 to 8 carbon atoms, especially 1 to 4 carbon atoms, for example, methoxy, ethoxy, propoxy, and butoxy. R is not limited to these unsubstituted monovalent hydrocarbon groups and alkoxy groups, but includes substituted ones of these groups wherein some or all of the hydrogen atoms each attached to a carbon atom are replaced by halogen atoms, cyano groups, alkoxy groups or the like, for example, substituted hydrocarbon groups such as chloromethyl, 3,3,3-trifluoropropyl, and cyanoethyl and substituted alkoxy groups.

$R^1$ is a photo-reactive group selected from a (meth)acryloyl-containing group, vinyloxyalkyl group, and epoxy-containing group. The (meth)acryloyl-containing groups include (meth)acryloxyalkyl groups wherein the alkyl moiety has 1 to 8 carbon atoms such as γ-acryloxypropyl and γ-methacryloxypropyl. The vinyloxyalkyl groups include those groups wherein the alkyl moiety has 3 to 8 carbon atoms such as vinyloxypropyl. The epoxy-containing groups include glycidoxyalkyl groups wherein the alkyl moiety has 3 to 8 carbon atoms such as γ-glycidoxypropyl and (3,4-epoxycyclohexyl)alkyl groups wherein the alkyl moiety has 2 to 8 carbon atoms such as β-(3,4-epoxycyclohexyl)ethyl.

At least two, preferably 2 to about 10, photo-reactive groups represented by $R^1$ should be contained in a molecule. With less than two photo-reactive groups represented by $R^1$, organopolysiloxanes are not curable. It is noted that $R^1$ may be attached to a silicon atom at an end of or intermediate a molecular chain.

The photo-reactive groups are classified in terms of their reaction mode into two types, radical reactive groups and cation reactive groups. Among the above-mentioned photo-reactive groups, the (meth)acryloyl-containing groups belong to the radical reactive groups while the vinyloxyalkyl and epoxy-containing groups belong to the cation reactive groups. Among these, products cured through cationic reaction leave in the cured silicone rubber cationic residues, which can largely affect the heat resistance of silicone rubber and hence, the effective life of a mold. A choice of the radical reactive groups is recommended from this aspect.

Letters a and b are positive numbers satisfying $1.90 \leq a < 2.40$, preferably $1.95 \leq a \leq 2.05$, $0.0003 \leq b \leq 0.10$, preferably $0.0005 \leq b \leq 0.05$, and $1.90 < a+b \leq 2.40$, preferably $1.96 \leq a+b \leq 2.1$. The organopolysiloxane of formula (1) may be linear or branched. Its molecular chain is end-blocked with a triorganosiloxy group which may or may not contain one to three photo-reactive groups $R^1$ such as $R_3SiO-$, $R^1R_2SiO-$, $R^1_2RSiO-$, and $R^1_3SiO-$ groups.

The organopolysiloxane has a viscosity of 100 to 1,000,000 centipoise at 25° C., preferably 500 to 100,000 centipoise at 25° C. Organopolysiloxanes having a viscosity of less than 100 centipoise fail to provide rubbery nature and are brittle whereas organopolysiloxanes having a viscosity of more than 1,000,000 centipoise are too viscous to handle as a liquid composition.

The organopolysiloxanes of formula (1) can be synthesized by well-known methods. Organopolysiloxanes having an acryloyl group, for example, can be prepared by a method of attaching γ-acryloxypropyltrimethoxysilane to a diorganopolysiloxane terminated with a hydroxydimethylsilyl group at each end through dealcoholysis condensation, a method of attaching γ-acryloxymethyldimethylsilanol to a diorganopolysiloxane terminated with a trimethoxysilyl group at each end through dealcoholysis condensation, and a method of effecting equilibration between a hydrolyzate of γ-acryloxypropylmethyldimethoxysilane and octamethylcyclotetrasiloxane in the presence of a catalyst. By any of these methods, a diorganopolysiloxane having an acryl group introduced in a side chain is available and useful as component (A).

The silicone resin (B) is a component for imparting strength to the composition and concurrently increasing the hardness thereof. More particularly, since the silicone rubber composition as used herein cures into a product which must subsequently transmit light, high loading of reinforcing fillers used in conventional silicone rubbers is impossible. For this reason, the silicone resin becomes essential when it is desired to provide strength as typified by tensile strength and tear strength. The silicone resin has tri- and tetra-functional siloxane bonds and is soluble in component (A).

More illustratively, the silicone resin contains $R_pR^1_qSiO_{1/2}$ units (M), $SiO_2$ units (Q), and/or $XSiO_{3/2}$ units (T). The silicone resin may further contain $R_sR^1_tO_{2/2}$ units (D) in a molecule. R and $R^1$ are as defined above, and X is R or $R^1$. Letters p and q each are equal to 0, 1, 2 or 3 and satisfy p+q=3. Letters s and t each are equal to 0, 1 or 2 and satisfy s+t=2.

The molar ratio of M unit to T and Q units combined, that is, M/(Q+T) is from 0.6 to 1.2, preferably from 0.7 to 1.1. Silicone resins with a molar ratio M/(Q+T) of less than 0.6 are insoluble in component (A) and not reinforcing, or become white turbid and less transmissive to light. A molar ratio M/(Q+T) of more than 1.2 suggests a reduction of silica structure, failing to provide the reinforcing effect.

In order that silicone resin (B) exert the reinforcing effect, it must be integrated with component (A) after crosslinking. For this reason, silicone resin (B) must partially contain a photo-reactive group represented by $R^1$ as does component (A). The content of photo-reactive group $R^1$ is in the range of 0.01 to 0.1 mol, preferably 0.02 to 0.08 mol per mol of silicon atom contained in the silicone resin. A silicone resin with a $R^1$ content of less than 0.01 mol is not incorporated in crosslinkages, resulting in a cured product retaining surface tack. A silicone resin with a $R^1$ content of more than 0.1 mol is too hard and results in a cured product losing elasticity and becoming brittle.

The silicone resin is synthesized, for example, by hydrolyzing γ-acryloxypropyltrimethoxysilane and tetramethoxysilane in such a ratio as to meet the above-mentioned composition. Alternatively, the silicone resin can be obtained by reacting residual silanol of a conventionally prepared silicone resin with γ-acryloxypropyltrimethoxysilane or chlorosilane.

The blend of components (A) and (B) is 30 to 100% by weight, especially 50 to 90% by weight of component (A) and 0 to 70% by weight, especially 10 to 50% by weight of component (B) provided that the total of components (A) and (B) is 100% by weight. Component (B) need not be added in some applications where no strength is necessary. Compositions containing more than 70% by weight of component (B) have an increased viscosity, cease to be liquid, and cure into brittle parts which are practically unacceptable.

The first composition is based on (i) an organopolysiloxane consisting of the above-mentioned components (A) and (B) and (ii) a photo-initiator. The photo-initiator is to trigger reaction of component (i) upon light exposure to create a three-dimensional linkage, forming a rubber molding. Among the above-mentioned photo-reactive groups, an organopolysiloxane bearing (meth)acryloyl-containing groups undergoes curing through radical reaction whereas an organopolysiloxane bearing epoxy or vinylether groups undergoes curing through cationic reaction. In this sense, the photo-initiators include radical initiators and cationic initiators. Examples of the radical initiator include acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenxophenone, 3-chloroxanthone, 3,9-dichloroxanthone, 3-chloro-8-nonylxanthone, benzoin, benzoin methyl ether, benzoin butyl ether, bis(4-dimethylaminophenol) ketone, benzyl methoxyketal, and 2-chlorothioxanthone. Useful known examples of the cationic photo-polymerization initiator include diazonium salts such as 4-morpholino-2,5-dimethoxyphenyl diazonium fluoroborate, and iodonium salts such as a diphenyl iodonium salt of arsenic hexafluoride and an octoxyphenylphenyl iodonium salt of antimony hexafluoride.

The photo-initiator (ii) is added in an amount of 0.01 to 5 parts by weight per 100 parts by weight of component (i), that is, components (A) and (B) combined. Since the silicone rubber composition must play the role of transmitting light at the end of curing, the addition of photo-initiator (ii) which essentially absorbs light becomes a negative factor with respect to light transmission. Therefore, the photo-initiator (ii) should preferably be added in a minimum amount enough for the composition to cure, more preferably in an amount of 0.01 to 0.5 part by weight per 100 parts by weight of component (i). Less than 0.01 part of photo-initiator (ii) is insufficient to cause the silicone rubber composition to cure or to form a mold. With more than 5 parts of photo-initiator (ii), the silicone rubber composition would cure into a mold which is less transmissive to light so that a long time is taken in subsequent curing of the photo-curable resin within the mold, that is, the resulting mold is an inadequately light transmissive mold.

Second Photo-curable Liquid Silicone Rubber Composition

The second photo-curable liquid silicone rubber composition is comprised of (iii) an organopolysiloxane and (iv) a photo-initiator. The organopolysiloxane (iii) consists of (C) 30 to 100% by weight of an organopolysiloxane of the following average compositional formula (2):

$$R_cR^2_dSiO_{(4-c-d)/2} \qquad (2)$$

wherein R, which is identical or different, is a substituted or unsubstituted monovalent hydrocarbon group free of an aliphatic unsaturated bond or an alkoxy group; $R^2$, which is identical or different, is an aliphatic unsaturated group selected from an alkenyl group and an oxygen atom-containing aliphatic unsaturated group; and letters c and d are positive numbers satisfying $1.90 \leq c < 2.40$, $0.0003 \leq d \leq 0.10$, and $1.90 < c+d \leq 2.40$, the organopolysiloxane containing at least two aliphatic unsaturated groups in a molecule and having a viscosity of 100 to 1,000,000 centipoise at 25° C., and (D) 0 to 70% by weight of a silicone resin comprising $R_pR_2^qSiO_{1/2}$ units (M), $SiO_2$ units (Q), and/or $YSiO_{3/2}$ units (T) wherein R and $R^2$ are as defined above, letters p and q each are equal to 0, 1, 2 or 3 and satisfy p+q=3, Y is selected from R and $R^2$, molar ratio M/(Q+T)=0.6 to 1.2, and molar ratio $R^2$/Si=0.01 to 0.10, the silicone resin being soluble in component (C). The composition further contains (E) an organosilane or organosiloxane containing at least two mercapto groups in a molecule in such an amount that the equivalent of mercapto group may be 0.1 to 20 relative to the aliphatic unsaturated group supplied from components (C) and (D).

In the organopolysiloxane of formula (2), R is as defined for R in the first composition. $R^2$ is at least one aliphatic unsaturated group selected from an alkenyl group and an oxygen atom-containing aliphatic unsaturated group, preferably having 2 to 10 carbon atoms, especially 2 to 6 carbon atoms. Examples of the group represented by $R^2$ include alkenyl groups such as vinyl, allyl, propenyl, and hexenyl, alkenyloxyalkyl groups (preferably excluding vinyloxyalkyl groups) such as allyloxypropyl, and alkenyloxy groups such as propenoxy.

At least two, preferably 2 to about 10, aliphatic unsaturated groups represented by $R^2$ should be contained in a molecule. With less than two aliphatic unsaturated groups represented by $R^2$, organopolysiloxanes are not curable. It is noted that $R^2$ may be attached to a silicon atom at an end of or intermediate a molecular chain.

Letters c and d are positive numbers satisfying $1.90 \leq c < 2.40$, preferably $1.95 \leq c \leq 2.05$, $0.0003 \leq d \leq 0.10$, preferably $0.0005 \leq d \leq 0.05$, and $1.90 < c+d \leq 2.40$, preferably $1.96 \leq c+d \leq 2.06$. The organopolysiloxane of formula (2) may be linear or branched. Its molecular chain is end-blocked with a triorganosiloxy group which may or may not contain one to three aliphatic unsaturated groups $R^2$ such as $R_3SiO$—, $R^2R_2SiO$—, $R^2{}_2RSiO$—, and $R^2{}_3SiO$— groups.

The organopolysiloxane of formula (2) has a viscosity of 100 to 1,000,000 centipoise at 25° C., preferably 500 to 100,000 centipoise at 25° C. Organopolysiloxanes having a viscosity of less than 100 centipoise fail to provide rubbery nature and are brittle whereas organopolysiloxanes having a viscosity of more than 1,000,000 centipoise are too viscous to handle as a liquid composition.

Like the silicone resin (B), the silicone resin (D) is a component for imparting strength to the composition and concurrently increasing the hardness thereof. More particularly, since the silicone rubber composition as used herein cures into a product which must subsequently transmit light, high loading of reinforcing fillers used in conventional silicone rubbers is impossible. For this reason, the silicone resin becomes essential when it is desired to provide strength as typified by tensile strength and tear strength. The silicone resin has tri- and tetra-functional siloxane bonds and is soluble in component (C).

More illustratively, the silicone resin contains $R_pR^2{}_qSiO_{1/2}$ units (M), $SiO_2$ units (Q), and/or $YSiO_{3/2}$ units (T). The silicone resin may further contain $R_sR^2{}_tO_{2/2}$ units (D) in a molecule. R and $R^2$ are as defined above, and Y is R or $R^2$. Letters p and q each are equal to 0, 1, 2 or 3 and satisfy $p+q=3$. Letters s and t each are equal to 0, 1 or 2 and satisfy $s+t=2$.

The molar ratio of M unit to T and Q units combined, that is, M/(Q+T) is from 0.6 to 1.2, preferably from 0.7 to 1.1. Silicone resins with a molar ratio M/(Q+T) of less than 0.6 are insoluble in component (C) and not reinforcing, or become white turbid and less transmissive to light. A molar ratio M/(Q+T) of more than 1.2 suggests a reduction of silica structure, failing to provide the reinforcing effect.

In order that silicone resin (D) exert the reinforcing effect, it must be integrated with component (C) after crosslinking. For this reason, silicone resin (D) must partially contain an aliphatic unsaturated group represented by $R^2$ as does component (C). The content of aliphatic unsaturated group $R^2$ is in the range of 0.01 to 0.1 mol per mol of silicon atom contained in the silicone resin. A silicone resin with a $R^2$ content of less than 0.01 mol is not incorporated in crosslinkages, resulting in a cured product retaining surface tack. A silicone resin with a $R^2$ content of more than 0.1 mol is too hard and results in a cured product losing elasticity and becoming brittle.

The silicone resin is synthesized, for example, by hydrolyzing vinyltrimethoxysilane and tetramethoxysilane in such a ratio as to meet the above-mentioned composition. Alternatively, the silicone resin can be obtained by reacting residual silanol of a conventionally prepared silicone resin with vinyltrimethoxysilane or chlorosilane. Furthermore, the silicone resin can also be obtained by hydrolyzing water glass or tetraethoxysilane and reacting the hydrolyzate with 1,3-divinyl-1,1,3,3-tetramethyldisiloxane.

Components (C) and (D) are blended such that the blend is 30 to 100% by weight, especially 50 to 90% by weight of component (C) and 0 to 70% by weight, especially 10 to 50% by weight of component (D) provided that the total of components (C) and (D) is 100% by weight. Component (D) need not be added in some applications where no strength is necessary. Compositions containing more than 70% by weight of component (D) have an increased viscosity, cease to be liquid, and cure into brittle parts which are practically unacceptable.

Contained as component (E) in the second composition is an organosilane or organosiloxane containing at least two, preferably 2 to about 50, mercapto groups in a molecule. This organosilane or organosiloxane (E) is a crosslinking component which reacts with aliphatic unsaturated groups in components (C) and (D) to form a rubbery elastomer. Any desired compound may be used insofar as it contains in a molecule at least two mercapto groups, for example, mercaptoalkyl groups represented by —$(CH_2)_r$—SH wherein r is 1 to 6, such as γ-mercaptopropyl. To maintain light transparency, the compound should have a silane or siloxane bond well compatible with the organopolysiloxane.

Illustrative examples of the organosilane or organosiloxane (E) are linear, cyclic or branched organopolypiloxanes of the following formulae.

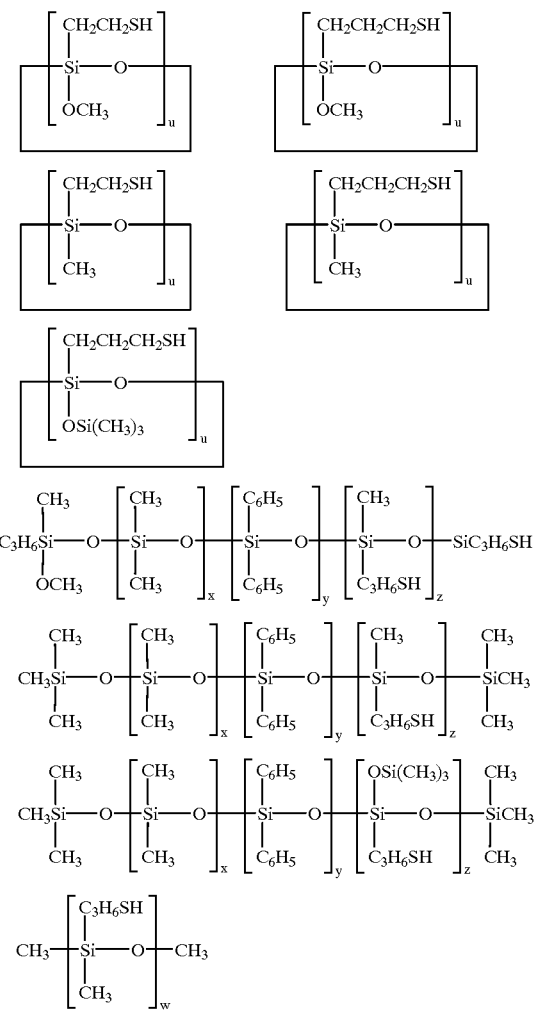

In the formulae, letter u is an integer of at least 3, x, y and v are integers inclusive of 0, and z and w are integers of at least 2.

These organosiloxanes may be used alone or in admixture of two or more.

As component (E), linear compounds are often used because of ease of synthesis as mentioned above although compounds of the structure containing Q units, for example, a hydrolyzate of γ-mercaptopropyltrimethoxysilane and tetramethoxysilane may also be used.

Component (E) is blended in such an amount that the equivalent of mercapto group may be 0.1 to 20, preferably 0.5 to 4.0, relative to the aliphatic unsaturated group supplied from components (C) and (D). Insufficient curing occurs with less than 0.1 equivalent whereas beyond 20 equivalents, the crosslinking agent becomes excessive, also leading to insufficient curing.

The second composition is based on (iii) an organopolysiloxane consisting of the above-mentioned components (C) and (D), component (E), and (iv) a photo-initiator. The photo-initiator is to trigger reaction of component (iii) upon light exposure to create a three-dimensional linkage, forming a rubber molding. Examples of the photo-initiator include acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenol) ketone, benzyl methoxyketal, and 2-chlorothioxanthone.

The photo-initiator (iv) is added in an amount of 0.01 to 5 parts by weight per 100 parts by weight of component (iii). Since the silicone rubber composition must play the role of transmitting light at the end of curing, the addition of photo-initiator (iv) which essentially absorbs light becomes a negative factor with respect to light transmission. Therefore, the photo-initiator (iv) should preferably be added in a minimum amount enough for the composition to cure, more preferably in an amount of 0.01 to 0.5 part by weight per 100 parts by weight of component (iii). Less than 0.01 part of photo-initiator (iv) is insufficient to cause the silicone rubber composition to cure or to form a mold. With more than 5 parts of photo-initiator (iv), the silicone rubber composition would cure into a mold which is less transmissive to light so that a long time is taken in subsequent curing of the photo-curable resin within the mold, that is, the resulting mold is an inadequately light transmissive mold.

Third Photo-curable Liquid Silicone Rubber Composition

The third photo-curable liquid silicone rubber composition is comprised of an organopolysiloxane consisting of (C) 30 to 100% by weight of an organopolysiloxane of the following average compositional formula (2):

$$R_cR^2_dSiO_{(4-c-d)/2} \quad (2)$$

wherein R, which is identical or different, is a substituted or unsubstituted monovalent hydrocarbon group free of an aliphatic unsaturated bond or an alkoxy group; $R^2$, which is identical or different, is an aliphatic unsaturated group selected from an alkenyl group and an oxygen atom-containing aliphatic unsaturated group; and letters c and d are positive numbers satisfying $1.90 \leq c < 2.40$, $0.0003 \leq d \leq 0.10$, and $1.90 < c+d \leq 2.40$, the organopolysiloxane containing at least two aliphatic unsaturated groups in a molecule and having a viscosity of 100 to 1,000,000 centipoise at 25° C., and (D) 0 to 70% by weight of a silicone resin comprising $R_pR^2_qSiO_{1/2}$ units (M), $SiO_2$ units (Q), and/or $YSiO_{3/2}$ units (T) wherein R and $R^2$ are as defined above, letters p and q each are equal to 0, 1, 2 or 3 and satisfy p+q=3, Y is selected from R and $R^2$, molar ratio M/(Q+T)=0.6 to 1.2, and molar ratio $R^2$/Si=0.01 to 0.10, the silicone resin being soluble in component (C). The composition further contains (F) an organohydrogenpolysiloxane of the following average compositional formula (3):

$$R_eH_fSiO_{(4-e-f)/2} \quad (3)$$

wherein R, which is identical or different, is a substituted or unsubstituted monovalent hydrocarbon group free of an aliphatic unsaturated bond or an alkoxy group, letters e and f are positive numbers satisfying $0.70 \leq e \leq 2.69$, $0.01 \leq f \leq 1.20$, and $1.5 \leq e+f \leq 2.7$, the organohydrogenpolysiloxane containing at least two SiH groups in a molecule, in such an amount that 0.4 to 10 SiH groups are available per aliphatic unsaturated group supplied from components (C) and (D), and (G) a catalytic amount of a platinum catalyst for effecting hydrosilylation between the aliphatic unsaturated groups in components (C) and (D) and the SiH group in component (F) upon light exposure.

The identity and blending proportion of components (C) and (D) are as described in conjunction with the second composition.

In addition to components (C) and (D), the third composition contains an organohydrogenpolysiloxane of formula (3) as component (F). This organohydrogenpolysiloxane serves as a crosslinking agent for undergoing hydrosilylation with the organopolysiloxane, more specifically aliphatic unsaturated groups in components (C) and (D) in the presence of the platinum catalyst for thereby promoting crosslinking to form a rubbery elastomer.

In formula (3), R is as defined for R in formula (1). Letters e and f are positive numbers satisfying $0.70 \leq e \leq 2.69$, preferably $1.0 \leq e \leq 2.0$, $0.01 \leq f \leq 1.20$, preferably $0.02 \leq f \leq 1.1$, and $1.5 \leq e+f \leq 2.7$, preferably $1.9 \leq e+f \leq 2.4$. This organohydrogenpolysiloxane may be linear, branched, cyclic or three-dimensional network insofar as it has at least 2 SiH groups, preferably at least 3 SiH groups, more preferably 3 to about 100 SiH groups (hydrogen atoms each attached to a silicon atom). It is understood that SiH groups may be present at an end of or intermediate a molecular chain.

The organohydrogenpolysiloxane usually has a viscosity of about 2 to 1,000 centipoise at 25° C.

The organohydrogenpolysiloxane is blended in such an amount that 0.4 to 10 SiH groups, preferably 0.8 to 4 SiH groups are available per aliphatic unsaturated group supplied from components (C) and (D). Insufficient curing occurs with less than 0.4 equivalent whereas beyond 10 equivalents, the crosslinking agent becomes excessive, also leading to insufficient curing.

Further blended as component (G) in the third composition is a platinum catalyst. The platinum catalyst is preferably a photo-functional platinum catalyst which can give a sufficient pot-life in that after all the above-mentioned components are combined, no curing is induced until preparatory steps necessary to fabricate a silicone rubber mother mold such as mixing and casting steps are completed. Examples of the photo-functional platinum catalyst include (η-diolefin)(σ-aryl)platinum complexes as disclosed in JP-A 168061/1984 corresponding to U.S. Pat. No. 4,530,879 and platinum compounds controlled with azodicarboxylic acid esters as disclosed in JP-B 50375/1988 corresponding to U.S. Pat. No. 4,640,939. Also useful are platinum compounds controlled with optical active diketones such as benzoylacetone and acetylene dicarboxylic acid esters and platinum catalysts included in photo-degradable organic resins. The platinum catalyst is not limited to these examples.

Component (G) is blended in a catalytic amount, often about 1 to 2,000 ppm, especially about 10 to 200 ppm of platinum metal.

It is understood that the first to third compositions mentioned above may further contain fumed silica, transparent glass beads, and quartz glass powder insofar as the light transmission effect is not impaired. Also a hydrosilylation controlling agent may be blended in the third composition.

The liquid silicone rubber composition preferably has a viscosity of about 100 to 1,000,000 centipoise at 25° C., more preferably about 1,000 to 100,000 centipoise at 25° C.

When a mother mold is fabricated from a photo-curable liquid silicone rubber composition as mentioned above, a master model fabricated in the master model forming process mentioned above is first placed in a container which is desirably constructed of light transmissive members, for example, members of transparent resins such as acrylic resins and polycarbonate resins and members of transparent inorganic materials such as glass and synthetic quartz, and a liquid silicone rubber composition is then introduced into the container. Alternatively, a liquid silicone rubber composition is first introduced into a container and a master model is then submerged in the liquid composition. Thereafter, light is irradiated to the liquid silicone rubber composition through the container for curing the composition. By deaerating in vacuum the liquid silicone rubber composition prior to the curing step, there can be obtained a more precise silicone rubber mother mold. In the light irradiating step, light sources are preferably placed such that the silicone rubber composition is exposed to light in all directions whereby the silicone rubber composition can be uniformly and briefly cured.

For the purpose of preventing air from inhibiting the curing of the silicone rubber composition, it is effective to cover the surface of the silicone rubber composition in the container with a light transmissive lid of the same material as above. Also, the silicone rubber mother mold may be provided in the curing step with a runner for subsequently introducing a photo-curable liquid resin into the silicone rubber mother mold. At the end of curing, the master model has been embedded in the silicone rubber part. The cured silicone rubber part is cut into sections, which are separated from each other, allowing the master model to be removed therefrom. Then the cured silicone rubber sections are mated to construct a silicone rubber mother mold in which a cavity corresponding to the outer contour of the master model is defined. If the runner is not previously provided in the silicone rubber mother mold, the silicone rubber may be machined to form such a runner during or after the cutting step.

No particular limit is imposed on the composition of the photo-curable liquid resin which is cast into the silicone rubber mother mold and cured with light to form a replica according to the invention. Although many well-known photo-curable liquid resins are useful, preferred are radical polymerization type liquid resin compositions comprising as essential components (1) a low molecular weight compound having at least one ethylenically unsaturated bond, an oligomer thereof or a mixture thereof and (2) a photo-initiator capable of absorbing actinic radiation to initiate polymerization.

The low molecular weight compound having an ethylenically unsaturated bond and the oligomer as component (1) are those containing a group capable of addition polymerization such as acryloyl, methacryloyl and vinyl groups in a molecule.

Examples of the low molecular weight compound having an ethylenically unsaturated bond include hydroxyalkyl methacrylates and acrylates such as hydroxyethyl methacrylate and acrylate, hydroxypropyl methacrylate and acrylate; polyoxyethylene glycol dimethacrylates and diacrylates such as ethylene glycol dimethacrylate and diacrylate, diethylene glycol dimethacrylate and diacrylate, tetraethylene glycol dimethacrylate and diacrylate; polyoxypropylene glycol dimethacrylates and diacrylates such as propylene glycol dimethacrylate and diacrylate, dipropylene glycol dimethacrylate and diacrylate, tripropylene glycol dimethacrylate and diacrylate; alkanediol dimethacrylates and diacrylates such as butanediol dimethacrylate and diacrylate, hexanediol dimethacrylate and diacrylate, nonanediol dimethacrylate and diacrylate; trimethylolpropane trimethacrylate and triacrylate, dimethacrylates and diacrylates of diols obtained by adding ethylene oxide or propylene oxide to a bisphenol skeleton; N-substituted acrylamides such as N-methylolacrylamide, diacetoneacrylamide, and N,N-dimethylacrylamide; N-substituted methacrylamides such as N,N-dimethylmethacrylamide; styrene and divinyl benzene.

Examples of the oligomer having an ethylenically unsaturated bond include unsaturated polyurethanes and unsaturated polyesters.

The unsaturated polyurethanes are obtained by reacting a diol compound, a diisocyanate compound, and a compound having both a hydroxyl or amino group and an ethylenically unsaturated bond. They usually have a number average molecular weight of about 800 to 30,000 as measured by gas permeation chromatography (GPC) using polystyrene as a standard. Examples of the diol compound include polyether diols such as polyethylene glycol, polypropylene glycol, and polytetramethylene glycol, and polydiols such as polypropylene glycol adipate diol, polyneopentyl glycol adipate diol, and polycaprolactone diol. The diols compounds usually have a number average molecular weight of about 400 to 3,000. Examples of the diisocyanate compound include toluylene diisocyanate and hexamethylene diisocyanate. Examples of the compound having both a hydroxyl or amino group and an ethylenically unsaturated bond include 2-hydroxyethyl methacrylate and acrylate, 2-hydroxypropyl methacrylate and acrylate, polypropylene glycol monomethacrylate and acrylate, polyethylene glycol monomethacrylate and acrylate, aminoethyl methacrylate and acrylate.

The unsaturated polyesters are obtained by effecting dehydration condensation between a dicarboxylic acid and a diol to form polyesters while the polyesters are tailored to be unsaturated by the following means. For example, a dicarboxylic acid having an unsaturated bond such as fumaric acid and maleic acid is used as at least part of the dicarboxylic acid. Alternatively, a methacryloyl or acryloyl group is introduced into the polyesters utilizing a terminal carboxyl or hydroxyl group.

Examples of the dicarboxylic acid include unsaturated dicarboxylic acids such as fumaric acid and maleic acid, saturated dicarboxylic acids and aromatic dicarboxylic acids such as adipic acid, sebasic acid, azelaic acid, isophthalic acid, and terephthalic acid. Examples of the diol include ethylene glycol, propylene glycol, hexane diol, diethylene glycol, polyethylene glycol, and polypropylene glycol.

To introduce an ethylenically unsaturated bond utilizing a terminal carboxyl or hydroxyl group, esterification may be carried out using a compound having both a hydroxyl group and an ethylenically unsaturated group such as 2-hydroxyethyl methacrylate and acrylate, 2-hydroxypropyl methacrylate and acrylate, and a compound having both a carboxyl group and an ethylenically unsaturated group such as methacrylic acid and acrylic acid.

Various well-known photo-initiators may be used as the photo-initiator (2) capable of absorbing actinic radiation to initiate polymerization. Examples include benzoin derivatives such as benzoin methyl ether, benzoin isopropyl ether, benzoin isobutyl ether, benzoin n-butyl ether, α-methylolbenzoin methyl ether, α-methoxybenzoin methyl ether, and α-ethoxybenzoin ethyl ether; 1-hydroxycyclohexylphenyl-acetophenone and 1-benzyl-1-dimethylaminopropyl-p-morpholinoketone.

The photo-initiator is used in an effective amount to initiate polymerization. Since photo-cured silicone rubber is used as the mold, light irradiated toward the cast photo-curable liquid resin through the mold is partially absorbed by the mold so that only weaker light may reach the liquid resin. In order that the liquid resin cure under such conditions, the photo-initiator is generally added in an amount of at least 0.1% by weight, preferably at least 1% by weight based on the total weight of the photo-curable liquid resin composition. A too much amount of the photo-initiator would give rise to the trouble that a longer exposure time is necessary because the intensity of light reaching the interior of the photo-curable liquid resin is further reduced and that the photo-curable liquid resin is not cured in some areas if the master model is of a unique shape. For this reason, the amount of the photo-initiator used is usually limited to 8% by weight.

In addition to these essential components, a stabilizer such as well-known thermal polymerization inhibitors may be added to the photo-curable liquid resin composition in order to render the composition stable during preparation or storage. Further, other additives such as mold release agents and plasticizers may be added to the photo-curable liquid resin composition if desired.

Besides, well-known photo-curable liquid resins of the cationic photo-polymerization type may also be used. The photo-curable liquid resin of this type is generally defined as comprising as essential components (1) a low molecular weight compound having a cationically polymerizable group such as epoxy and vinyl ether groups in a molecule, an oligomer thereof or a mixture thereof and (2) a cationic photo-polymerization initiator capable of generating an acid upon exposure to actinic radiation.

Examples of the low molecular weight compound having an epoxy group in a molecule include diglycidyl ether, glycerin triglycidyl ether, tris(hydroxyphenyl)propane triglycidyl ether, and products obtained by reacting a polyhydric phenol (e.g., bisphenols) with epichlorohydrin. Oligomers having a higher molecular weight can be obtained by reacting a polyhydric phenol with epichlorohydrin while changing the mix ratio and reaction conditions. Also useful are oligomers having an epoxy group obtained by reacting an oligomer having a double bond with a peracid such as peracetic acid. Examples of the cationic photo-polymerization initiator include diazonium salts such as 4-morpholino-2,5-dimethoxyphenyldiazonium fluoroborate, iodonium salts such as a diphenyl iodonium salt of arsenic hexafluoride and an octoxyphenylphenyliodonium salt of antimony hexafluoride, as is well known in the art.

In general, the photo-curable liquid resin of the cationic photo-polymerization type has the nature that curing reaction hardly occurs with light of lower intensity. Therefore, when a photo-curable liquid resin is fed into the mother mold of photo-cured silicone rubber to form a replica, a photo-curable liquid resin of the cationic photo-polymerization type can be used only under certain limited conditions including the wall gage of the mold and the shape of the master model. In this respect, the radical polymerization type is advantageous.

The photo-curable liquid resin to be cast should desirably have a lower viscosity, preferably less than about 200 poise at 20° C., more preferably less than 120 poise at 20° C. in order that bubbles entrained during working steps escape and the liquid resin spread throughout the cavity of the photo-cured silicone rubber mother mold. It is noted that the viscosity of the photo-curable liquid resin can be lowered by blending a larger proportion of the low molecular weight compound. It is also effective to add liquid plasticizers such as silicone oil in such an amount as not to affect the remaining properties. If the photo-curable liquid resin has a higher viscosity, its working viscosity can be lowered by elevating the temperature upon casting. However, since the photo-curable liquid resin can degrade at elevated temperatures, the temperature should be below the limit at which such degradation occurs.

The light source used for the curing of the photo-curable liquid resin is to emit actinic radiation capable of inducing radiation curing. Commonly used light sources include lamps emitting ultraviolet light having a wavelength of 200 to 500 nm, preferably 300 to 400 nm, such as UV fluorescent lamps, high pressure mercury vapor lamps, metal halide lamps, and xenon lamps. Using the same light source as used in the fabrication of the photo-cured silicone rubber mold is convenient in that both the preparation of the mold and the preparation of replicas can be carried out with the same exposure apparatus.

By deaerating in vacuum the photo-curable liquid resin prior to the curing step, there can be obtained a more precise replica.

EXAMPLE

Examples of the invention are given below by way of illustration and not by way of limitation. All parts are by weight.

Preparation of a Master Model

Figure 2:
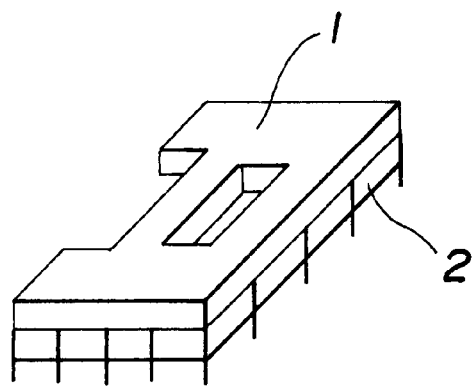
Figure 3:
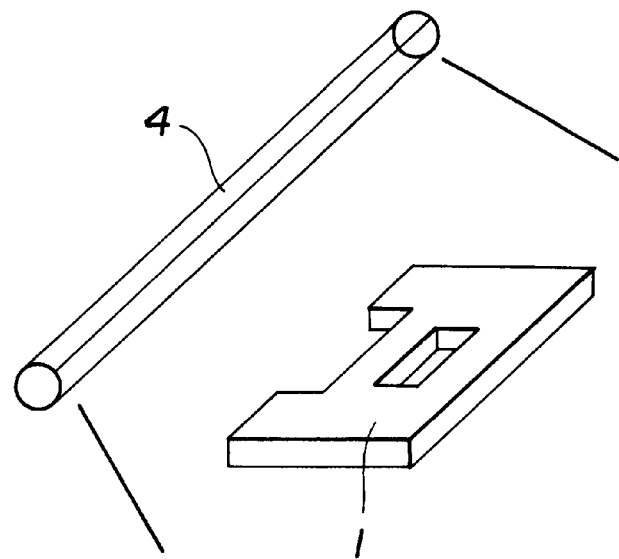

Using a computer 3 as shown in FIG. 1, three-dimensional CAD data of a master model 1 as shown in FIG. 2 having a shrinkage factor of a photosensitive resin taken into account were produced. At the same time, data regarding a support portion 2 for maintaining strength upon preparation of the master model 1 by means of an optical shaping machine were produced. The master model 1 was prepared by inputting the three-dimensional CAD data into an optical shaping system "SOLIFORM" manufactured by Teijin Seiki K.K., supplying a photo-curable resin TSR800, and irradiating UV laser beams at a pitch of 5 μm. To complete curing of the master model 1, the master model 1 was exposed to UV from a UV fluorescent lamp 4 as shown in FIG. 3 for carrying out secondary curing.

Silicone Rubber Composition and Molding of a Mother Mold

Silicone rubber mother molds were prepared using the following compositions A and B.

Photo-curable Liquid Silicone Rubber Composition A

A composition A was prepared by blending 75 parts of a dimethylpolysiloxane blocked with a vinyldimethylsiloxy group at each end and having a viscosity of 100,000 centipoise at 25° C., 25 parts of a silicone resin consisting of CH$_2$=CH(CH$_3$)$_2$SiO$_{1/2}$, (CH$_3$)$_3$SiO$_{1/2}$, and SiO$_2$ units in a molar ratio of the total of CH$_2$=CH(CH$_3$)$_2$SiO$_{1/2}$ and (CH$_3$)$_3$SiO$_{1/2}$ units to the SiO$_2$ units of 0.8, having a vinyl group equivalent of 0.9 mol/100 g, and soluble in the dimethylpolysiloxane, 7 parts of a mercapto-containing organopolysiloxane of the following formula (1) having a viscosity of 30 centipoise at 25° C., and 0.4 part of 2,2-diethoxyacetophenone.

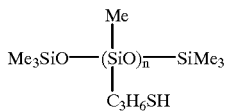

(1)

Photo-curable Liquid Silicone Rubber Composition B

A composition B was prepared by blending 50 parts of a polydimethylsiloxane blocked with a group of the following formula (2) at each end and having a viscosity of 1,000 centipoise at 25° C., 50 parts of fumed silica, and 2.0 parts of 2,2-diethoxyacetophenone.

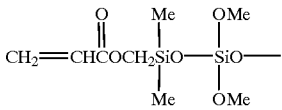

(2)

Figure 4:
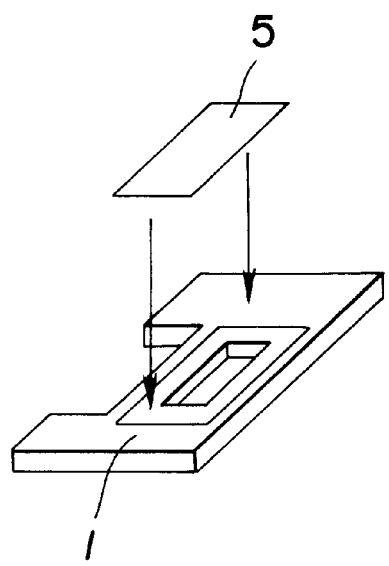

The support portion 2 was removed by cutting from the master model 1 obtained in the Preparation of a master model, obtaining a master model from which a replica was to be duplicated. A piece of tape 5 was attached to a region of the master model 1 where an opening or window was located as shown in FIG. 4.

Figure 5:
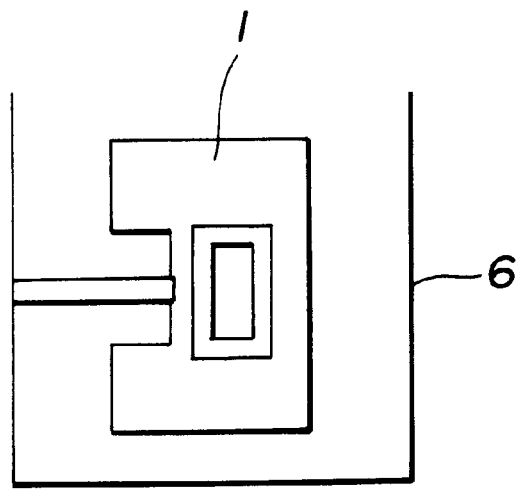

A frame 6 into which a photo-curable liquid silicone rubber composition was to be cast was prepared using a UV-transmissive acrylic resin. As shown in FIG. 5, the master model 1 was placed in the acrylic frame 6 and secured thereto such that the master model 1 was spaced a gap of 20 to 30 mm from the acrylic frame 6.

Figure 6:
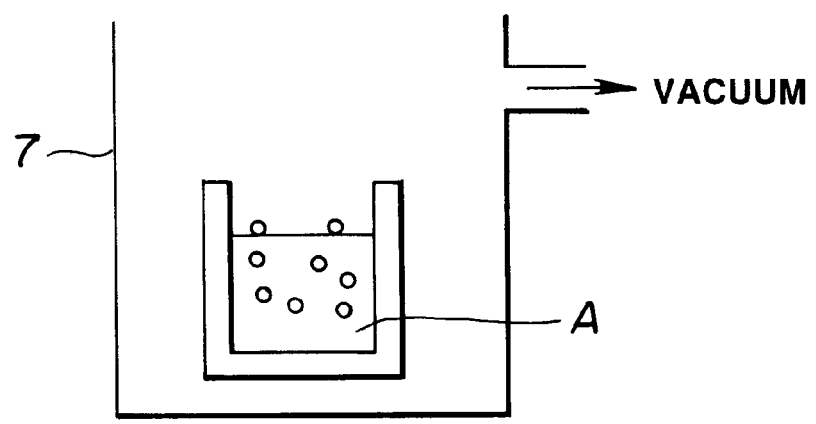
Figure 7:
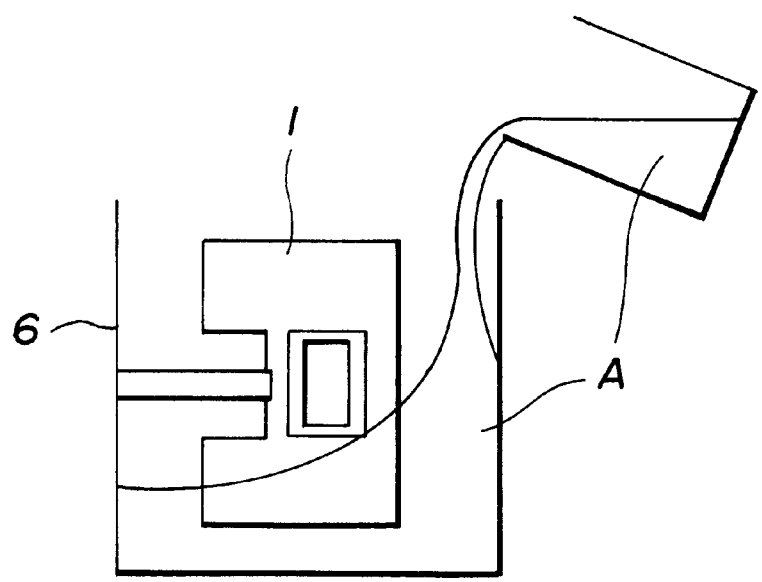
Figure 8:
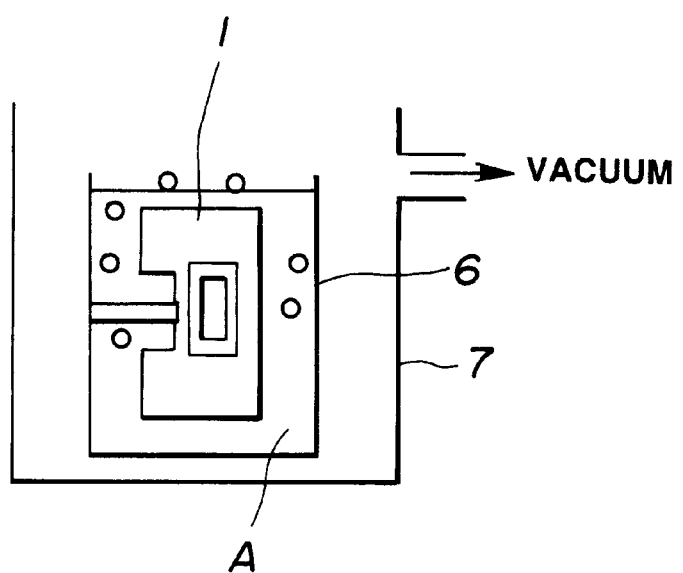

After the photo-curable liquid silicone rubber composition A was previously deaerated in a vacuum tank 7 as shown in FIG. 6 for removing the air dissolved in the silicone rubber composition, the deaerated silicone rubber composition A was cast into the acrylic frame 6 in such a manner that there were entrained as few bubbles as possible as shown in FIG. 7 until the frame 6 was fully filled with the silicone rubber composition. The acrylic frame 6 filled with the silicone rubber composition A was placed in the vacuum tank 7 again whereupon deaeration was performed as shown in FIG. 8.

Figure 9:
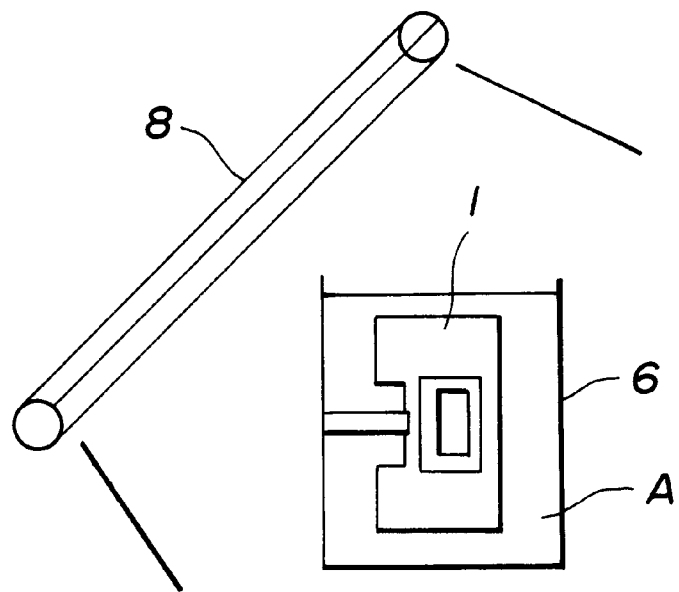
Figure 10:
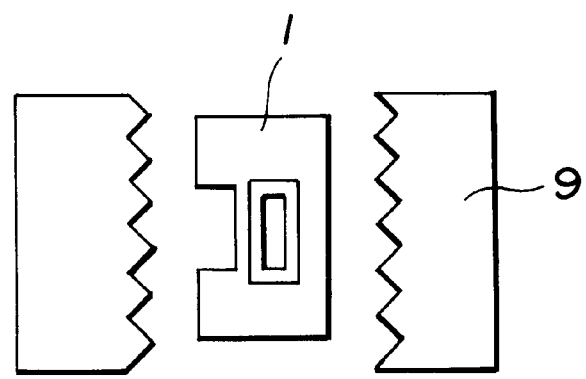
Figure 11:
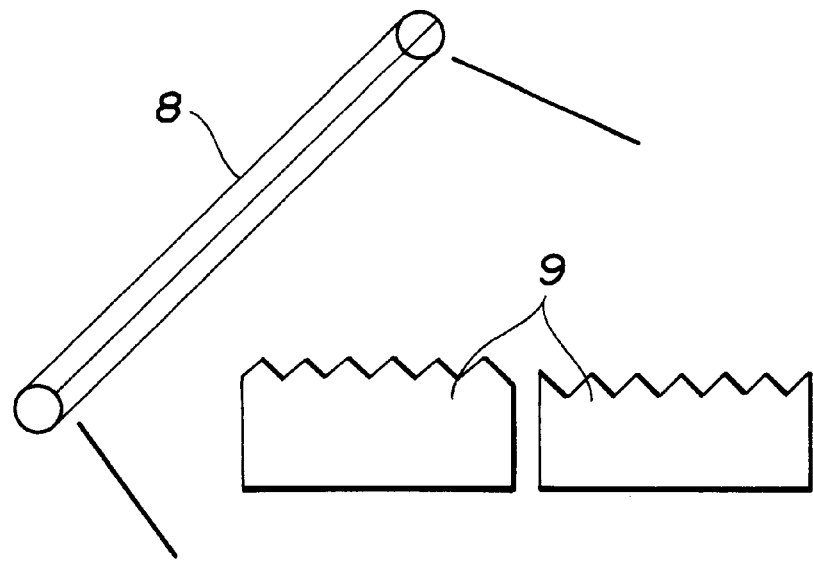

The frame 6 filled with the silicone rubber composition A was placed in a rectangular exposure chamber where 40-W fluorescent lamps 8 emitting UV at a center wavelength of 370 nm were disposed at six side walls as shown in FIG. 9. In this condition, the silicone rubber composition A was exposed to UV for 10 minutes. The cured silicone rubber mold having the master model 1 embedded therein was taken out of the acrylic frame. Using a surgical knife, the silicone rubber mold 9 was cut into two sections, cavity and core sections whereupon the master model 1 was removed therefrom as shown in FIG. 10. The cavity and core sections of the silicone rubber mold 9 were again exposed to UV for 5 minutes under the UV fluorescent lamps 8 for promoting curing as shown in FIG. 11. At this point, the silicone rubber mold 9 had a surface hardness of 34 as measured by a JIS A scale hardness meter and faithfully reproduced the negative pattern of the master model 1.

Also, a silicone rubber mold was similarly prepared using the photo-curable liquid silicone rubber composition B. This silicone rubber mold had a surface hardness of 55 as measured by a JIS A scale hardness meter and faithfully reproduced the negative pattern of the master model 1.
Photo-curable Resin and Molding of a Replica Replicas were produced using the following photo-curable resin compositions C and D.
Photo-curable Resin Composition C An unsaturated polyurethane having a methacrylate group at each end and a number average molecular weight of 8,000 was obtained by reacting 1,000 g of polycaprolactone diol having a molecular weight of 500 with 410 g of tolylene diisocyanate to form an oligomer blocked with an isocyanate group at each end, and further reacting the oligomer with 410 g of 2-hydroxypropyl methacrylate.

A liquid photo-curable resin composition C having a viscosity of 80 poise at 20° C. was obtained by mixing 120 g of the unsaturated polyurethane, 40 g of 2-hydroxypropyl methacrylate, 20 g of N-methylol acrylamide, 20 g of methacrylamide, 5 g of α-methoxybenzoin methyl ether, and 0.2 g of 2,6-di-t-butyl-p-cresol.
Photo-curable Resin Composition D An unsaturated polyester having an acid value of 35 mg KOH/g was obtained by mixing 430 g of diethylene glycol, 124 g of fumaric acid, 310 g of isophthalic acid, and 140 g of itaconic acid and effecting dehydrating condensation reaction.

A liquid photo-curable resin composition D having a viscosity of 120 poise at 20° C. was obtained by mixing 100 g of the unsaturated polyester, 20 g of hydroxypropyl methacrylate, 10 g of diacetone acrylamide, 10 g of diethylene glycol dimethacrylate, 3 g of α-methoxybenzoin methyl ether, and 0.2 g of 2,6-di-t-butyl-p-cresol.

Figure 12:
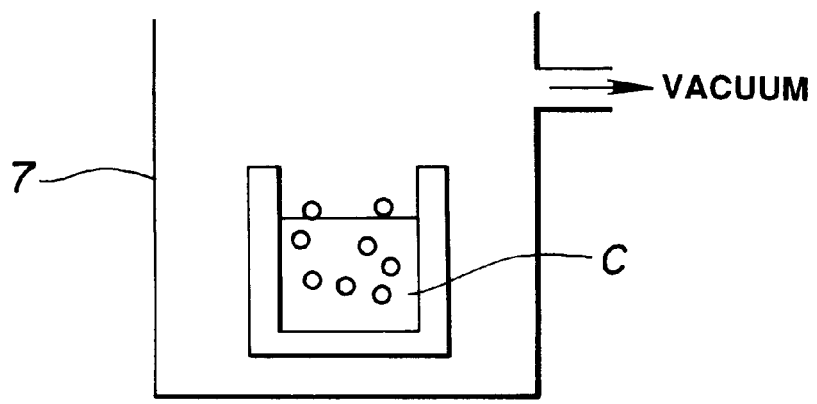
Figure 13:
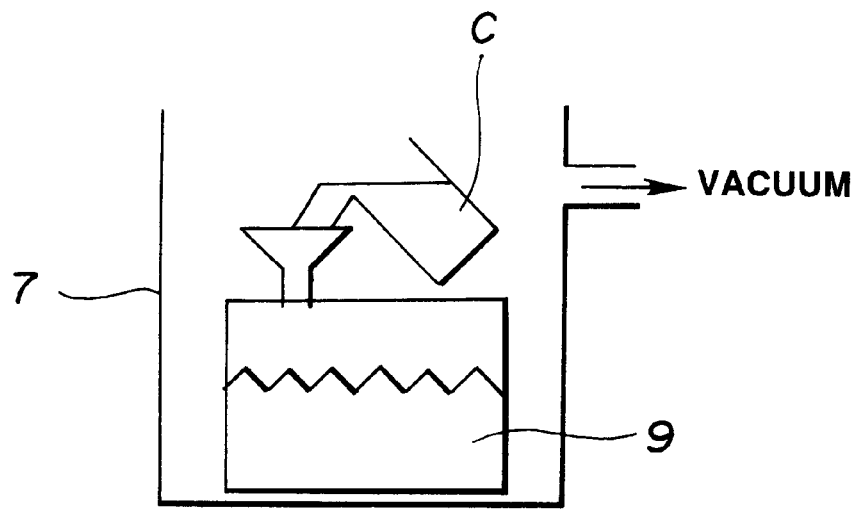
Figure 14:
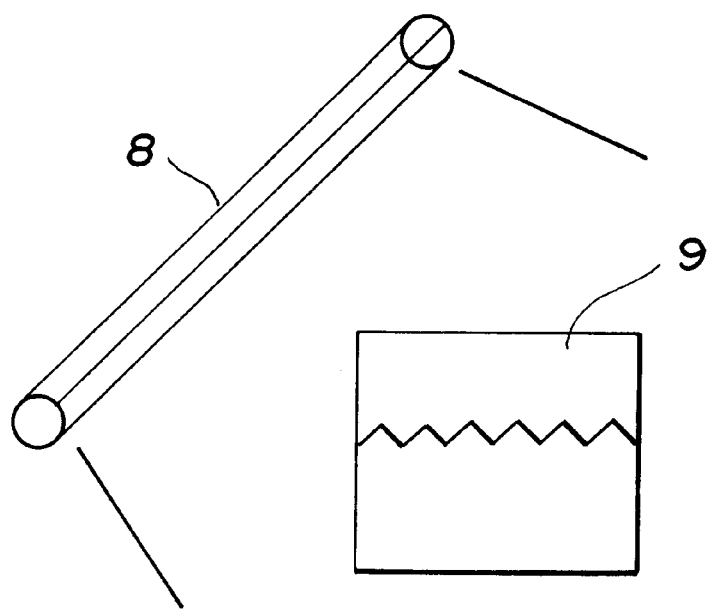

The liquid photo-curable resin composition C was pre-heated at 40° C. and deaerated under vacuum with stirring as shown in FIG. 12. The two sections of the photo-cured silicone rubber mold 9 (obtained from the photo-curable liquid silicone rubber composition A) were mated to define the cavity, into which the liquid photo-curable resin composition C was cast as shown in FIG. 13. The mold 9 filled with the liquid photo-curable resin composition C was placed in a rectangular exposure chamber where 40-W fluorescent lamps 8 emitting UV at a center wavelength of 370 nm were disposed at six side walls as shown in FIG. 14. In this condition, the liquid photo-curable resin composition C was exposed to UV for 10 minutes.

Figure 15:
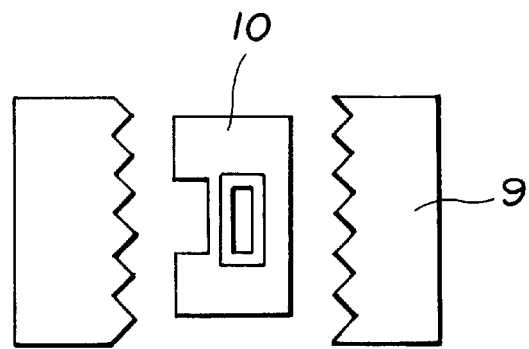
Figure 16:
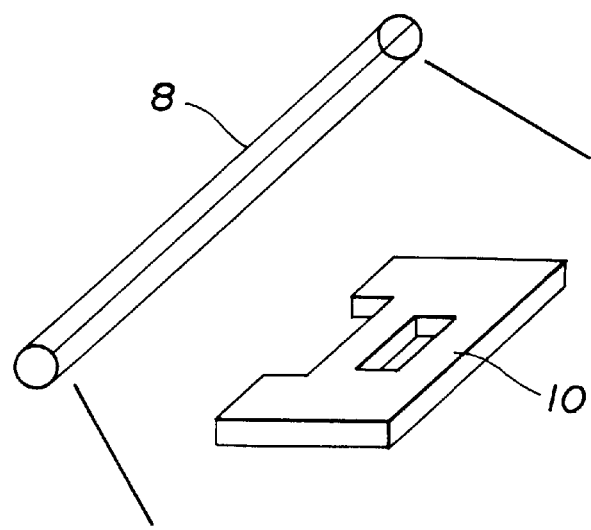

Thereafter, the mold 9 was opened and a cured product of the liquid photo-curable resin composition C was taken out as a replica 10 as shown in FIG. 15. To complete the curing of the replica 10, the replica was placed in a rectangular exposure chamber where 40-W fluorescent lamps 8 emitting UV at a center wavelength of 370 nm were disposed at six side walls as shown in FIG. 16. In this condition, the replica 10 was exposed to UV for 5 minutes.

The replica had a Shore D hardness of 82 degrees at 20° C. and faithfully reproduced the original shape.

A replica was similarly produced using the liquid photo-curable resin composition D. This replica had a Shore D hardness of 65 degrees at 20° C. and faithfully reproduced the original shape.

Figure 17:
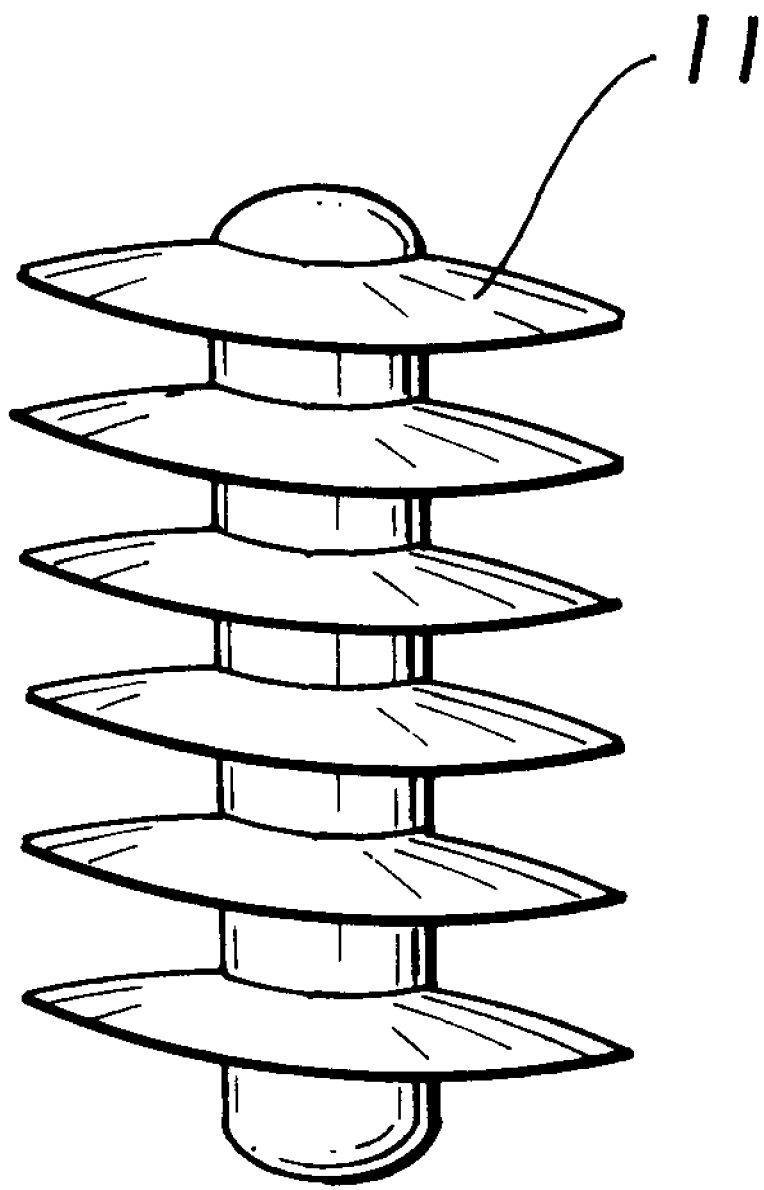
FIG. 17 is a perspective view of one exemplary replica.

A replica 11 of a screw shape as shown in FIG. 17 was produced by the same procedure as above. For comparison purposes, a replica 11 was produced by a prior art vacuum casting method. The time required for the production of the replica was compared between the inventive method and the prior art method. The results are shown in Table 1.

TABLE 1

|  | Prior art vacuum casting | Invention |
|---|---|---|
| Making of master model steps of FIGS. 1–3 X = 70 mm Y = 70 mm Z = 100 mm (average gage 2 mm) | Machining of plastic material Working time = 35 hr. | Optical shaping Use photo-curable liquid resin Working time = 12 hr. |
| Making of silicone mold steps of FIGS. 4–11 (room temperature atmosphere) | Use addition-curable liquid silicone rubber composition working time = 13 hr. | Use photo-curable liquid silicone rubber composition working time = 15 min. |
| Making of replica steps of FIGS. 12–16 | Use thermosetting liquid urethane resin working time = 1 hr. | Use photo-curable liquid resin working time = 10 min. |
| Total working time | 49 hr. | ~12.5 hr. |

There has been described a method for molding a replica by curing a photo-curable liquid silicone rubber composition to form a transparent mother mold with a wall having a thickness of several millimeters or several hundred millimeters, casting a photo-curable liquid resin into the mother mold, and irradiating light to the liquid resin through the mold wall. Replicas can be fabricated by simple steps and within a short time.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A method for molding a replica, comprising the steps of forming a mother mold of a photo-cured liquid silicone rubber composition, the mother mold having a mold cavity corresponding to the outer contour of an article to be duplicated and the photo-cured liquid silicone rubber composition being sufficiently transmissive of light such that light is transmitted to the mold cavity from outside the mold,
filling the mold cavity with a photo-curable liquid resin, and
irradiating light at a wavelength in the range of 200 to 500 nm to the photo-curable liquid resin from outside the mother mold and through the liquid silicone rubber composition, thereby curing the photo-curable liquid resin within the mother mold to produce a replica.

2. The method of claim 1, wherein the cured mother mold has a Shore A hardness of 20 to 60.

3. The method of claim 1, wherein the cured mother mold has an actinic radiation transmittance of at least 10% T at a mold gage of 10 mm.

4. The method of claim 1, wherein the photo-curable liquid resin for producing the replica is a radical polymerization type liquid resin composition comprising a low molecular weight compound having at least one ethylenically unsaturated bond, an oligomer thereof or a mixture thereof, and a photo-initiator.

5. The method of claim 4, wherein the photo-initiator is provided in an amount of 0.1 to 8% by weight based on the total weight of the photo-curable liquid resin.

6. The method of claim 1, wherein the photo-cured liquid silicone rubber composition is the cured product of a composition comprising: (i) 100 parts by weight of an organop-olysiloxane and (ii) 0.01 to 5 parts by weight of a photo-initiator, the organopolysiloxane (i) consisting of:

(A) 30 to 100% by weight of an organopolysiloxane of the following average compositional formula (1):

$$R_a R^1_b SiO_{(4-a-b)/2} \tag{1}$$

wherein R, which is identical or different, is a substituted or unsubstituted monovalent hydrocarbon group free of an aliphatic unsaturated bond or an alkoxy group; $R^1$, which is identical or different, is a photo-reactive group selected from a (meth)acryloyl-containing group, vinyloxyalkyl group, and epoxy-containing group; and letters a and b are positive numbers satisfying $1.90 \leq a \leq 2.40$, $0.0003 \leq b \leq 0.10$, and $1.90 \leq a+b \leq 2.40$, the organopolysiloxane containing at least two photo-reactive groups in a molecule and having a viscosity of 100 to 1,000,000 centipoise at 25° C., and (B) 0 to 70% by weight of a silicone resin comprising $R_p R^1_q SiO_{1/2}$ units (M), $SiO_2$ units (Q), and/or $XSiO_{3/2}$ units (T) wherein R and $R^1$ are as defined above, letters p and q each are equal to 0, 1, 2 or 3 and satisfy p+q=3, X is selected from R and $R^1$, molar ratio M/(Q+T)=0.6 to 1.2, and molar ratio $R^1$/Si=0.01 to 0.10, the silicone resin (B) being soluble in component (A).

7. The method of claim 1, wherein the photo-cured liquid silicone rubber composition is the cured product of a composition comprising: (iii) an organopolysiloxane and (iv) a photo-initiator, the organopolysiloxane (iii) consisting of:

(C) 30 to 100% by weight of an organopolysiloxane of the following average compositional formula (2):

$$R_c R^2_d SiO_{(4-c-d)/2} \tag{2}$$

wherein R, which is identical or different, is a substituted or unsubstituted monovalent hydrocarbon group free of an aliphatic unsaturated bond or an alkoxy group; $R^2$, which is identical or different, is an aliphatic unsaturated group selected from an alkenyl group and an oxygen atom-containing aliphatic unsaturated group; and letters c and d are positive numbers satisfying $1.90 \leq c \leq 2.40$, $0.0003 \leq d \leq 0.10$, and $1.90 \leq c+d \leq 2.40$, the organopolysiloxane containing at least two photo-reactive groups in a molecule and having a viscosity of 100 to 1,000,000 centipoise at 25° C., (D) 0 to 70% by weight of a silicone resin comprising $R_p R^2_q SiO_{1/2}$ units (M), $SiO_2$ units (Q), and/or $YSiO_{3/2}$ units (T) wherein R and $R^2$ are as defined above, letters p and q each are equal to 0, 1, 2 or 3 and satisfy p+q=3, Y is selected from R and $R^2$, molar ratio M/(Q+T)=0.6 to 1.2, and molar ratio $R^2$/Si=0.01 to 0.10, the silicone resin (D) being soluble in component (C), and (E) an organosilane or organosiloxane containing at least two mercapto groups in a molecule in such an amount that the equivalent of mercapto groups is 0.1 to 20 relative to the aliphatic unsaturated groups supplied from components (C) and (D).

8. The method of claim 1, wherein the photo-cured liquid silicone rubber composition is the cured product of a composition comprising:

an organopolysiloxane of the following average compositional formula (2):

$$R_c R^2_d SiO_{(4-c-d)/2} \tag{2}$$

wherein R, which is identical or different, is a substituted or unsubstituted monovalent hydrocarbon group free of an aliphatic unsaturated bond or an alkoxy group; $R^2$, which is identical or different, is an aliphatic unsaturated group selected from an alkenyl group and an oxygen atom-containing aliphatic unsaturated group; and letters c and d are positive numbers satisfying $1.90 \leq c \leq 2.40$, $0.0003 \leq d \leq 0.10$, and $1.90 \leq c+d \leq 2.40$, the organopolysiloxane containing at least two aliphatic unsaturated groups in a molecule and having a viscosity of 100 to 1,000,000 centipoise at 25° C., (D) 0 to 70% by weight of a silicone resin comprising $R_p R^2_q SiO_{1/2}$ units (M), $SiO_2$ units (Q), and/or $YSiO_{3/2}$ units (T) wherein R and $R^2$ are as defined above, letters p and q each are equal to 0, 1, 2 or 3 and satisfy p+q=3, Y is selected from R and $R^2$, molar ratio M/(Q+T)=0.6 to 1.2, and molar ratio $R^2$/Si=0.01 to 0.10, the silicone resin (D) being soluble in component (C), (F) an organohydrogenpolysiloxane of the following average compositional formula (3):

$$R_e H_f SiO_{(4-e-f)/2} \qquad (3)$$

wherein R, which is identical or different, is a substituted or unsubstituted monovalent hydrocarbon group free of an aliphatic unsaturated bond or an alkoxy group, letters e and f are positive numbers satisfying $0.70 \leq e \leq 2.69$, $0.01 \leq f \leq 1.20$, and $1.5 \leq e+f \leq 2.7$, the organohydrogenpolysiloxane containing at least two SiH groups in a molecule, in such an amount that 0.4 to 10 SiH groups are available per aliphatic unsaturated group supplied from components (C) and (D), and (G) a catalytic amount of a platinum catalyst for effecting hydrosilylation between the aliphatic unsaturated groups in components (C) and (D) and the SiH group in component (F) upon light exposure.

9. A method for molding a replica, comprising the steps of (a) filling a container having at least one light-transmissive side surface with a photo-curable liquid silicone rubber composition, submerging a master model in the liquid silicone rubber composition, and irradiating light to the liquid silicone rubber composition to cure the composition to form a light-transmissive silicone rubber part having the master model embedded therein, (b) cutting the silicone rubber part into sections and removing the master model therefrom, the sections when mated constituting a silicone rubber mother mold having a cavity corresponding to the outer contour of the master model, (c) mating the sections of the silicone rubber mother mold, filling the cavity with a photo-curable liquid resin, and irradiating light at a wavelength in the range of 200 to 500 nm to the photo-curable liquid resin from outside the mother mold and through the liquid silicone rubber composition cured in (a), thereby curing the photo-curable liquid resin within the mother mold to produce a replica, (d) removing the replica from the silicone rubber mother mold.

10. The method of claim 9, wherein the master model of particular shape and dimensions is produced by an optical shaping process of irradiating light to a photo-curable liquid resin composition on the basis of CAD data regarding the shape and dimensions of the master mold model designed by three-dimensional CAD techniques, thereby curing the resin composition.

11. The method of claim 9, wherein the cured mother mold has a Shore A hardness of 20 to 60.

12. The method of claim 9, wherein the cured mother mold has an actinic radiation transmittance of at least 10% T at a mold gage of 10 mm.

13. The method of claim 9, wherein the photo-curable liquid resin for producing the replica is a radical polymerization type liquid resin composition comprising a low molecular weight compound having at least one ethylenically unsaturated bond, an oligomer thereof or a mixture thereof, and a photo-initiator.

14. The method of claim 13, wherein the photo-initiator is provided in an amount of 0.1 to 8% by weight based on the total weight of the photo-curable liquid resin.

* * * * *

UNITED STATES PATENT AND TRADEMARK OFFICE
CERTIFICATE OF CORRECTION

PATENT NO.     : 6,342,178 B1
DATED          : January 29, 2002
INVENTOR(S)    : Matsuoka et al.

It is certified that error appears in the above-identified patent and that said Letters Patent is hereby corrected as shown below:

<u>Title page,</u>
Item [73], should read as follows: -- Shonan Design Co., Ltd., Kanagawa-ken, JP; Shin-Etsu Chemical Co., Ltd., Tokyo, JP; and Asahi Kasei Kabushiki Kaisha, Osaka, JP. --

Signed and Sealed this

Fifth Day of November, 2002

Attest:

Attesting Officer

JAMES E. ROGAN
*Director of the United States Patent and Trademark Office*